Figure 1:
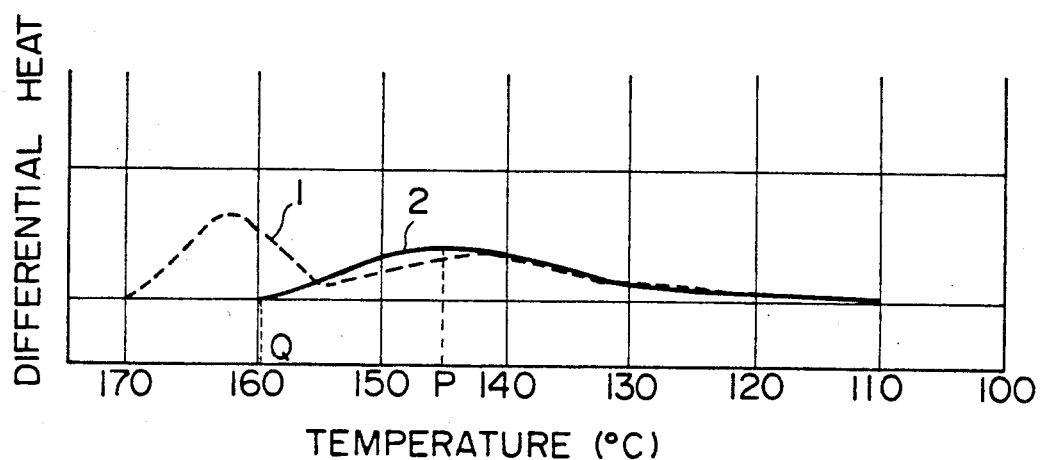

United States Patent [19]

Kuwabara et al.

[11] Patent Number: 5,071,883
[45] Date of Patent: Dec. 10, 1991

[54] PROCESS FOR THE PRODUCTION OF EXPANDED PARTICLES OF A POLYOLEFIN RESIN

[75] Inventors: Hideki Kuwabara; Kazuo Tsurugai; Masato Naito; Hidehiro Sasaki, all of Utsunomiya, Japan

[73] Assignee: JSP Corporation, Japan

[21] Appl. No.: 573,805

[22] Filed: Aug. 28, 1990

[30] Foreign Application Priority Data

Aug. 30, 1989 [JP] Japan .................. 1-224251

[51] Int. Cl.⁵ .................................. C08J 9/228
[52] U.S. Cl. ........................ 521/60; 521/56; 521/58
[58] Field of Search .............. 521/60, 58, 56

[56] References Cited

U.S. PATENT DOCUMENTS 4,676,939  6/1987  Kuwabara et al. .............. 264/50

Primary Examiner—Morton Foelak
Attorney, Agent, or Firm—Lorusso & Loud

[57] ABSTRACT

A process for the production of expanded resin particles is disclosed, wherein an aqueous dispersion containing expandable particles of a polyolefin resin is discharged at a temperature higher than the softening point of the resin from a high pressure condition to a low pressure condition to expand the expandable particles and wherein the expandable particles contain fine particles of an inorganic material coated with an agent selected from isopropyltriisostearic titanate, tetraoctadecyl titanate, acetoalkoxyaluminum diisopropylates, stearic acid, methyltrimethoxysilane, methyltriethoxysilane, ethyltriethoxysilane, phenyltriethoxysilane and vinyltriethoxysilane.

8 Claims, 1 Drawing Sheet

PROCESS FOR THE PRODUCTION OF EXPANDED PARTICLES OF A POLYOLEFIN RESIN

This invention relates to a process for the production of expanded particles of a polyolefin resin.

There is a known method of preparing expanded particles of a polypropylene resin, which includes the steps of providing expandable particles of a polypropylene resin containing a volatile blowing agent, dispersing the particles in an aqueous medium contained in a closed vessel, heating the dispersion to a temperature higher than the softening point of the resin while maintaining the pressure within the vessel at a pressure above the vapor pressure of the blowing agent, and discharging the dispersion from the vessel for subjecting same to an atmosphere maintained at a pressure lower than that within the vessel, thereby the particles discharged are expanded. Examples of the volatile blowing agent include propane, butane, pentane, trichlorofluoromethane and dichlorodifluoromethane.

Such a method, however, has been found to involve some problems due to the use of such a volatile blowing agent. Firstly, the temperature at which the expansion is performed should be limited to a specific, narrow range, since otherwise the expandable particles are swelled with the blowing agents which are good solvents for the polymeric material. Therefore, the expansion ratio which is dependent upon the expansion temperature is unavoidably limited within a narrow range. Secondly, some of these blowing agents are dangerous because of their toxicity and inflammability and require the replacement with air after completion of the expansion. Such a replacement requires the recovery of the blowing agents not only because of their expensiveness but also because of their tendency to destroy the ozone layer surrounding the earth.

To cope with these problems, there is a proposed process for the production of expanded particles of a polypropylene resin wherein expandable polypropylene particles containing fine particles of an inorganic expansion aid and a blowing agent are expanded (U.S. Pat. No. 4,676,939). While this process permits the use of an inorganic gas as the blowing agent, it has been found that it still involves a problem because the use of an inorganic gas blowing agent results in the formation of so fine cells that it is difficult to obtain molded, foamed articles having both a high expansion ratio and good dimensional accuracy from such expanded particles.

The present invention has been made with a consideration of the above problems of the conventional expansion method.

In accordance with the present invention, there is provided a process for the production of expanded particles, wherein an aqueous dispersion containing expandable particles of a polyolefin resin first is maintained at a first pressure and a first temperature higher than the softening point of said polyolefin resin and thereafter is subjected to a second pressure lower than said first pressure so that the expandable particles are expanded and wherein said expandable particles contain fine particles of an inorganic material having a melting point higher than said first temperature in an amount of 0.05–2% based on the weight of said expandable particles, said process being characterized in that each of said fine particles is coated with an agent selected from the group consisting of isopropyltriisostearic titanate, tetraoctadecyl titanate, acetoalkoxyaluminum diisopropylates, stearic acid, methyltrimethoxysilane, methyltriethoxysilane, ethyltriethoxysilane, phenyltriethoxysilane and vinyltriethoxysilane.

Figure 2:
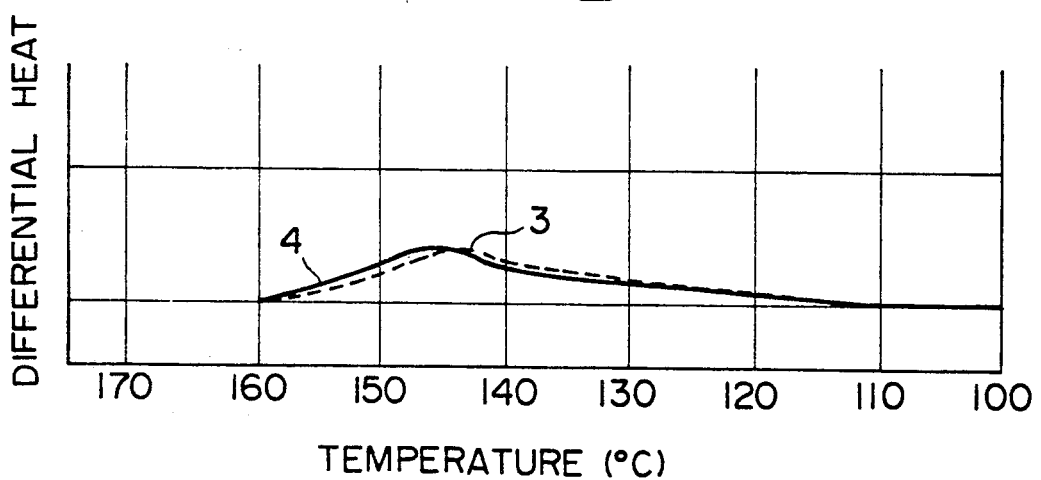

The present invention will now be described in detail below with reference to the accompanying drawings in which FIGS. 1 and 2 show DSC curves of polyolefin resins.

Both crosslinked and non-crosslinked polyolefin resins may be used as a raw material for the production of expanded particles in the process of the present invention. Examples of the non-crosslinked polyolefin resin include non-crosslinked polypropylene resins such as of propylene homopolymers, ethylene-propylene random copolymers, ethylene-propylene block copolymers, propylene-butene random copolymers and propylene-ethylene-butene random copolymers, and non-crosslinked polyethylene copolymers such as of linear, low density copolymers of ethylene with a $C_4$, $C_6$ or $C_8$ comonomer. Above all, the use of non-crosslinked propylene-ethylene random copolymers, especially those having an ethylene content of 1–10% by weight, propylene-butene random copolymers having a melting point of 135°–150° C., propylene-ethylene-butene copolymers having a melting point of 135°–150° C. and copolymers of ethylene with a $C_4$, $C_6$ or $C_8$ comonomer is preferred for reasons of providing good expandability.

As the crosslinked polyolefin resins, there may be suitably used crosslinked polypropylene resins. Examples of crosslinked polypropylene resin include crosslinked propylene homopolymers, crosslinked propylene-ethylene random copolymers, crosslinked propylene-ethylene block copolymers and crosslinked propylene-butene random copolymers. Above all, the use of crosslinked propylene-ethylene copolymers is preferred. The crosslinked polypropylene resins generally have a gel fraction of at least 0.1%.

The crosslinked polypropylene resins may be suitably obtained by a method including mixing a non-crosslinked polypropylene resin in the from of particles, a crosslinking agent, divinylbenzene and an aqueous medium to impregnate the resin particles with the blowing agent and divinylbenzene, and heating the resulting mixture to a temperature sufficient to decompose the crosslinking agent. Illustrative of suitable crosslinking agents are 1,1-bis(t-butylperoxy)-3,3,5-trimethylcyclohexane, dicumyl peroxide, t-butylcumyl peroxide, n-butyl-4,4-bis(t-butylperoxy)valerate, $\alpha,\alpha'$-bis(t-butylperoxy)-m-diisopropylbenzene and 2,5-dimethyl-2,5-di(t-butylperoxy)hexane. The crosslinking agent is used in an amount of 0.05–5 parts by weight, preferably 0.1–2 parts by weight per 100 parts by weight of the resin. Divinylbenzene is generally used in an amount of 0.05–5 parts by weight per 100 parts by weight of the resin.

One of the important features of the present invention resides in the incorporation of a specific expansion aid into the raw material polyolefin resin. The expansion aid is fine particles of an inorganic material coated with a surface treating agent selected from the group consisting of isopropyltriisostearic titanate, tetraoctadecyl titanate, acetoalkoxyaluminum diisopropylates, stearic acid, methyltrimethoxysilane, methyltriethoxysilane, ethyltriethoxysilane, phenyltriethoxysilane and vinyltriethoxysilane. The chemical structures of these agents are as follows:

Isopropyltriisostearic titanate: 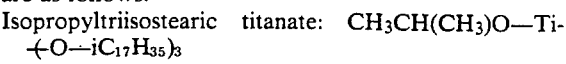

Tetraoctadecyl titanate: Ti$-$(OC$_{17}$H$_{35}$)$_4$
Acetoalkoxyaluminum diisopropylates:
(CH$_3$CH(CH$_3$)O)$_2$—Al—OC(CH$_3$)=CH—COOR
Stearic acid: CH$_3$(CH$_2$)$_{16}$COOH
Methyltrimethoxysilane: CH$_3$—Si$-$(OCH$_3$)$_3$
Methyltriethoxysilane: CH$_3$—Si$-$(OC$_2$H$_5$)$_3$
Ethyltriethoxysilane: C$_2$H$_5$—Si$-$(OC$_2$H$_5$)$_3$
Phenyltriethoxysilane: C$_6$H$_5$—Si$-$(OC$_2$H$_5$)$_3$
Vinyltriethoxysilane: CH$_2$=CH—Si$-$(OC$_2$H$_5$)$_3$ The inorganic particles generally have a particle size of 0.1–150 μm, preferably 0.1–50 μm and should not melt at a temperature at which the expansion is performed. Illustrative of suitable inorganic materials are inorganic hydroxides such as aluminum hydroxide, calcium hydroxide and magnesium hydroxide; inorganic carbonates such as calcium carbonate, magnesium carbonate and barium carbonate; inorganic sulfites such as calcium sulfite and magnesium sulfite; inorganic sulfates such as calcium sulfate, magnesium sulfate and aluminum sulfate; inorganic oxides such as calcium oxide, aluminum oxide and silicon oxide; and clays or minerals such as talc, kaolin and zeolite. Above all, the use of an inorganic hydroxide such as aluminum hydroxide or an inorganic carbonate such as calcium carbonate is preferred because the expanded particles obtained therewith exhibit excellent moldability.

The expansion aid may be obtained by surface treating inorganic particles with the surface treating agent. This can be performed by mixing the inorganic particles with a solution containing the surface treating agent, followed by drying. For example, about 1 kg of inorganic particles are mixed with 50 ml of a volatile solvent such as methanol or ethanol and 30 g of a liquid containing about 1–5% by weight of a surface treating agent for about 10 minutes by means of a mixer. The resulting mixture is dried at 20°–60° C. in an oven for removing the solvent, thereby to give the expansion aid.

The amount of the surface treating agent coated over the inorganic particles is generally 0.5–5% based on the weight of the inorganic particles without coating. An amount of the surface treating agent below 0.5% by weight is insufficient to attain the object of the present invention. On the other hand, when the amount of the agent exceeds 5% by weight, the coated inorganic particles become sticky and difficult to handle.

The amount of the expansion aid incorporated into the polypropylene resin particles should be in the range of 0.05 to 2% based on the weight of the polypropylene particles. At least 0.05 weight % is necessary to achieve the object of the present invention. An amount of the expansion aid over 2 weight % causes excessive reduction of the pore size of the expanded particles. Preferably, the amount of the expansion aid is 0.1–1.0 weight %.

The polyolefin resin having homogeneously incorporated therein the expansion aid is shaped into particles for expansion treatment according to the present invention. Any conventional method may be adopted for the formation of the particles of the expansion aid-containing polyolefin resin. There may be used, for example, a method in which the resin and the expansion aid are kneaded at a temperature higher than the melting point of the resin, followed by pelletizing or shaping into particles; and a method in which polyolefin resin pellets with a high content of the expansion aid and polyolefin resin pellets without the expansion aid are kneaded at a temperature above the melting point of the resin, followed by pelletizing or shaping into particles. The expansion aid-containing polyolefin resin particles preferably have a particle size of 0.3 to 5 mm, more preferably 0.5 to 3 mm.

The expansion aid-containing polyolefin resin particles are subjected to an expansion step in a manner known per se. Thus, the resin particles are contacted with a blowing agent such as an inorganic gas, a volatile blowing agent or a mixture thereof to impregnate the resin particles with the blowing agent, heated to a temperature higher than the softening point of the resin, dispersed in an aqueous medium and maintained under a pressurized condition, thereby to obtain a dispersion maintained at a first pressure and containing expandable resin particles. By subjecting the dispersion to an atmosphere being a pressure lower than the first pressure, generally ambient pressure, the expandable resin particles are foamed and expanded. The expansion step is preferably performed by opening a valve or outlet port connected to the vessel in which the dispersion is contained under pressure, to thereby discharge the dispersion into the atmosphere.

Examples of the organic blowing agent include propane, butane, pentane, trichlorofluoromethane, dichlorodifluoromethane, chlorodifluoromethane, 1,2-dichloro-1,1,2,2-tetrafluoroethane, 1,1-dichloro-2,2,2-trifluoroethane, 1,2,2,2-tetrafluoroethane, 1-chloro-1,1-difluoroethane and 1-chloro-1,2,2,2-tetrafluoroethane. These compounds may be used singly or as a mixture of two or more. Such as organic blowing agent may be suitably used in an amount of 0.5 to 20 parts by weight, more preferably 1 to 15 parts by weight per 100 parts by weight of the polyolefin resin.

Examples of inorganic gas blowing agent include air, nitrogen, carbon dioxide, argon and helium. When an air inorganic gas is used as a blowing agent to expand the unexpanded particles of a polyolefin resin, the unexpanded particles are contacted with the inorganic gas at a pressurized condition, preferably at a pressure of 15–100 kg/cm$^2$G, more preferably 20–70 kg/cm$^2$G, preferably at a temperature higher than the softening point of the polyolefin resin. The contact time varies with the pressure, temperature, the kind of the polyolefin resin and the intended expansion ratio, but is generally 5 sec to 1 hour, preferably 5 min to 30 min, when the contact is performed at a temperature higher than the softening point of the resin.

The steps including impregnating the resin particles with the blowing agent, heating them, dispersing them in an aqueous medium, and pressurizing them for the formation of a dispersion containing expandable resin particles may be conducted in any desires order. Heating of the resin particles to a temperature above the softening point thereof is preferably carried out gradually, at a rate of 1°–10° C./min, more preferably 2°–5° C./min. The aqueous medium into which the resin particles are dispersed is generally water which optionally contains an organic solvent such as ethylene glycol, glycerin, methanol or ethanol.

In the present specification, the term "softening point" is intended to mean a value measured in accordance ASTM D648 with a load of 4.6 Kg/cm$^2$ and the term "melting point" is intended to refer to a value measured by differential scanning calorimetric analysis (DSC method (see "Plastics Analysis Guide", Hanser Publishers, page 264+)). In the DSC method, the sample is heated to 200°–300° C. in an atmosphere of nitrogen at a rate of 10° C./min (first heating stage) while measuring the temperature of the sample and the differential heat required for raising the temperature of the sample. After the sample is heated to a predetermined temperature, it is cooled to 50° C. at a rate of 10° C./min. Thereafter, the sample is heated again (second heating stage), for example, in the same manner as in the first heating stage. The melting point is a temperature (see point P in FIG. 1) at which a peak exists in the curve obtained when the results of the second heating stage are plotted with the temperature as abscissa against the differential heat as ordinate. When the curve has two or more peaks, the melting point represents the peak at the highest temperature. The temperature at which the curve reached to the base line (see, for example, point Q in FIG. 1) is termed "melt-completion temperature").

To prevent melt-adhesion of the polymer particles with each other during the expansion step, it is advisable to add to the dispersion finely divided solids which do not soften or melt at a temperature to which the resin particles are heated for effecting the expansion. Illustrative of suitable solids are aluminum oxide, titanium oxide, basic magnesium carbonate, basic zinc carbonate, calcium phosphate and calcium carbonate. Organic solid particles such as urea-formaldehyde resin particles which are insoluble in the aqueous medium may also be used. Such finely divided solid particles preferably have a particle size of 0.001 to 100 μm, more preferably 0.001 to 30 μm and may be used in an amount of 0.01 to 10 parts by weight per 100 parts by weight of the polyolefin resin particles. A surfactant such as sodium dodecylbenzenesulfonate may be suitably used in combination with the above inorganic solids for further improving the adhesion-preventing effect.

It is preferred that the expandable polyolefin resin particles contained in the dispersion which is subjected to lower pressure conditions for effecting the expansion have secondary crystals since the resulting expanded particles may exhibit excellent moldability and afford molded articles with an excellent dimensional stability. The presence of the secondary crystals is especially preferred when the polyolefin resin is a non-crosslinked polypropylene resin or a non-crosslinked, linear, low density polyethylene resin.

When a non-crosslinked polypropylene resin is used, the secondary crystals may be generally formed by maintaining the dispersion containing the expandable resin particles at a temperature between a temperature 20° C. lower than the melting point of the resin and the melt-completion temperature of the resin for a period of time of 5-90 min, preferably 15-60 min. When a non-crosslinked, linear, low density polyethylene resin is used, the secondary crystals may be generally formed by maintaining the dispersion containing the expandable resin particles at a temperature between a temperature 15° C. lower than the melting point of the resin and the melt-completion temperature of the resin for a period of time of 5-90 min, preferably 5-30 min. By allowing the secondary crystals to form and grow sufficiently, even when the dispersion is heated to an expansion temperature which is higher than the melt-completion temperature, the resultant expanded particles may still contain the secondary crystals which remain undestroyed during the expansion step.

Whether or not the expanded particles produced contain the secondary crystals can be tested by differential scanning calorimetry (DSC) techniques. For this purpose, the polyolefin resin particles (1 to 3 mg) is heated at a rate of 10° C./min to 220° C. using a differential scanning calorimeter while measuring the temperature of the sample and the heat required for heating the sample. The results are plotted with the temperature as abscissa and the heat as ordinate to give a curve (first DSC curve). The heated sample is then cooled at a rate of 10° C./min to about 40° C. Thereafter, the sample is again heated in the same manner as in the first heating stage as mentioned above to give a second DSC curve. Each of the first and second DSC curves has a peak (characteristic peak) which is responsible for the absorption of heat during the melting of the resin and which is characteristic to the resin. The temperature at the characteristic peaks in the first and second DSC curves are the same or different from each other. The difference is below 5° C., generally below 2° C., however. In addition to the characteristic peak there may be a peak (high temperature peak) in the first DSC curve at a temperature higher than that of the characteristic peak. The high temperature peak is attributed to the absorption of heat for the destruction of the secondary crystals. Thus, the existence or non-existence of the secondary crystals can be seen from the presence or absence of the high temperature peak. That is, if the first DSC curve shows substantially no such high temperature peak, then the sample is regarded as containing substantially no secondary crystals. The second DSC curve shows no such high temperature peak because the secondary crystals if any have been destroyed during the first heating stage. It is preferred that the difference in temperature between the high temperature peak and characteristic peak of the second DSC curve be great because the greater the difference the more stable are the secondary crystals. The difference is preferably over 5° C., more preferably over 10° C.

FIGS. 1 and 2 are DSC curves of Sample A (expanded particles of polypropylene resin having secondary crystals) and Sample B (expanded particles of polypropylene resin having no secondary crystals), respectively, obtained using a differential scanning calorimeter DT-30 (manufactured by Shimadzu Mfg. Co., Ltd.). In FIGS. 1 and 2, the curves 1 and 3 by dotted lines represent first DSC curves while curves 2 and 4 by solid lines are second DSC curves. The curve 1 in FIG. 1 has a high temperature peak at about 163° C. in addition to a characteristic peak at about 142° C., indicating the presence of secondary crystals in the expanded particles of Sample A. The curve 3 in FIG. 2 has only a characteristic peak at about 144° C., showing that no secondary crystals exist in the expanded particles of Sample B. The absence of a high temperature peak in curve 3 is ascribed to the omission of the secondary crystals-forming treatment. The high temperature peak disappears in the second DSC curve 2 of FIG. 1. As described previously, the P (146° C.) at which the second DSC curve 2 becomes maximum is the melting point of the resin and the point Q (160° C.) at which the second DSC curve 2 reaches to the base line represents the melt-completion temperature.

As described previously, the expansion temperature is generally not lower than the softening point of the polyolefin resin. A suitable expansion temperature varies with the kind of the blowing agent. For the expansion of non-crosslinked polypropylene resin particles, the expansion temperature is preferably between a temperature about 5° C. lower, more preferably 3° C. lower than the melting point and a temperature about 20° C. higher, more preferably about 15° C. higher than the melting point in the case where an inorganic gas is used by itself as the blowing agent. In the case of cojoint use of the inorganic gas and the volatile organic blowing agent, the expansion temperature is preferably between a temperature about 5° C. lower, more preferably 3° C. lower than the melting point and a temperature about 18° C. higher, more preferably 15° C. higher than the melting point. For the expansion of non-crosslinked, low density polyethylene resin particles, the expansion temperature is preferably between a temperature about 10° C. lower lower than the melting point and a temperature about 10° C. higher than the melting point in the case where an inorganic gas is used by itself as the blowing agent. In the case of cojoint use of the inorganic gas and the volatile organic blowing agent, the expansion temperature is preferably between a temperature about 15° C. lower, more preferably 12° C. lower than the melting point and a temperature about 8° C. higher, more preferably 5° C. higher than the melting point.

By incorporating the expansion aid of coated inorganic particles into the polyolefin resin particles to be expanded, expanded particles are obtained with a larger cell diameter than that obtained using non-coated inorganic particles even when an inorganic gas is used by itself as a blowing agent. The expanded particles obtained by the process of the present invention can be suitably used as a cushioning material. Especially, they are advantageously used as raw materials for the production of molded foamed articles. In the preparation of such molded articles, the expanded particles are filled in a mold and heated, for example, with steam for further expansion of the particles therewithin.

The following examples will further illustrate the present invention.

EXAMPLE 1

A non-crosslinked ethylene-propylene random copolymer having an ethylene content of 2.5 weight %, a melting point of 146° C. and a melt-completion temperature of 160° C. and an expansion aid (particles of an inorganic material coated with a surface treating agent) as shown in Table 1 were kneaded by means of a mixer and extruded through a die in a strand fashion. The extrudates were immediately immersed into cooling water to form expansion aid-containing polypropylene resin pellets. The content of the expansion aid in the pellets was as shown in Table 1. Into an air-tight vessel were charged 100 parts by weight of the thus obtained pellets, 1 part by weight of finely divided calcium phosphate, 0.25 part of sodium dodecylbenzene-sulfonate, 300 parts by weight of water. The mixture was then heated to a temperature as shown in Table 1 with stirring and maintained at that temperature for 15 minutes for preheating treatment. An inorganic gas as shown in Table 1 was then fed to the vessel to a pressure shown in Table 1. After heating the dispersion within the vessel to an expansion temperature as shown in Table 1 for 15 minutes, the vessel was opened to discharge the dispersion contained therewithin into an open atmosphere while maintaining the pressure therewithin unchanged, thereby the pellets were expanded. The apparent expansion ratio (a ratio by apparent volume of expanded particles to unexpanded particles) and the cell diameter of the resultant expanded particles were as shown in Table 1. The expanded particles thus obtained were then subjected to molding to form a molded article. The expanded particles were filled as such in a mold and heated with pressurized steam (3.2–4 kg/cm$^2$G) for further expansion thereof, thereby obtaining a molded article whose quality (dimensional accuracy and fusion) is shown in Table 1.

TABLE 1

| Test No. | Expansion Aid | | | Preheat Temperature (°C.) | Blowing Agent | | Expansion Temperature (°C.) | Expanded Particles | | Foamed Article | |
|---|---|---|---|---|---|---|---|---|---|---|---|
| | Inorganic Material (Size μm) | Treating Agent (Amount %)[*1] | Amount (wt. %)[*2] | | Kind | Pressure (Kg/cm$^2$) | | Expansion Ratio | Cell Diameter (mm) | Dimensional Accuracy[*3] | Fusion[*4] |
| 1 | Al(0.2)[*5] | A-1(3%)[*7] | 0.2 | 150 | Air | 45 | 155 | 11 | 0.35 | A | A |
| 2 | Al(0.2)[*5] | A-2(2%)[*8] | 0.5 | 150 | Air | 30 | 155 | 8 | 0.13 | A | A |
| 3 | Mg(0.4)[*6] | A-3(3%)[*9] | 0.1 | 147 | Air[*16] | 40 | 152 | 30 | 0.20 | A | A |
| 4 | Al(15) | A-4(5%)[*10] | 0.2 | 145 | N2 | 45 | 155 | 11 | 0.18 | A | A |
| 5 | Talc(3) | A-5(3%)[*11] | 0.3 | 150 | N2 | 50 | 156 | 13 | 0.15 | A | A |
| 6 | Al(3)[*5] | A-6(1.5%)[*12] | 0.2 | 150 | N2 | 70 | 156 | 15 | 0.16 | A | A |
| 7 | Al(3)[*5] | A-7(2%)[*13] | 0.2 | 147 | Air[*17] | 40 | 152 | 20 | 0.18 | A | A |
| 8 | Mg(3)[*6] | A-8(1%)[*14] | 0.3 | 150 | Air | 45 | 155 | 10 | 0.16 | A | A |
| 9 | Al(0.2)[*5] | A-9(3%)[*15] | 0.2 | 150 | Air | 30 | 155 | 11 | 0.16 | A | A |

TABLE 1-continued

| | Expansion Aid | | | Pre-heat Temperature (°C.) | Blowing Agent | | Expansion Temperature (°C.) | Expanded Particles | | Foamed Article | |
|---|---|---|---|---|---|---|---|---|---|---|---|
| Test No. | Inorganic Material (Size μm) | Treating Agent (Amount %)*1 | Amount (wt. %)*2 | | Kind | Pressure (Kg/cm²) | | Expansion Ratio | Cell Diameter (mm) | Dimensional Accuracy*3 | Fusion*4 |
| Comp | Al(0.2)*5 | — | 0.2 | 150 | N2 | 45 | 155 | 10 | 0.10 | C | A |

Remarks:
*1 % based on the weight of the inorganic material
*2 % based on the weight of the resin
*3 Dimensional accuracy is rated as follows:
A: Shrinkage in the widthwise direction is 3% or less.
B: Shrinkage in the widthwise direction is more than 3% but less than 4%.
C: Shrinkage in the widthwise direction is 4% or more.
*4 Fusion between cells is tested by cracking the molded sample and observing the breakage of the cells on the cracked surface. Fusion is rated as follows:
A: Broken cells amount to 60% or more.
B: Broken cells amount to 40% or more but less than 60%.
C: Broken cells amount to less than 40%.
*5 Aluminum hydroxide particles
*6 Magnesium carbonate particles
*7-*15
A-1: Methyltriethoxysilane
A-2: Methyltrimethoxysilane
A-3: Tetraoctadecyl titanate
A-4: Stearic acid
A-5: Isopropyltriisostearic titanate
A-6: Vinyltriethoxysilane
A-7: Phenyltriethoxysilane
A-8: Ethyltriethoxysilane
A-9: Acetoalkoxyaluminum diisopropylates
*16 mixed with air
*17 containing 3% by weight of butane

What is claimed is:

1. A process for the production of expanded particles, wherein an aqueous dispersion containing expandable particles of a polyolefin resin first is maintained at a first pressure and a first temperature higher than the softening point of said polyolefin resin and thereafter is subjected to a second pressure lower than said first pressure so that the expandable particles are expanded and wherein said expandable particles contain fine particles of an inorganic material having a melting point higher than said first temperature in an amount of 0.05-2% based on the weight of said expandable particles, said process being characterized in that each of said fine particles is coated with an agent selected from the group consisting of isopropyltriisostearic titanate, tetraoctadecyl titanate, acetoalkoxyaluminum diisopropylates, stearic acid, methyltrimethoxysilane, methyltriethoxysilane, ethyltriethoxysilane, phenyltriethoxysilane and vinyltriethoxysilane.

2. A process according to claim 1, wherein said fine particles of the inorganic material have a particle size of 0.1-150 μm.

3. A process according to claim 1, wherein the amount of said agent is 0.5-5% based on the weight of said inorganic material.

4. A process according to claim 1, wherein said inorganic material is selected from the group consisting of hydroxides, oxides, carbonates, sulfates, sulfites, clays and clay minerals.

5. A process according to claim 1, wherein said inorganic material is selected from the group consisting of aluminum hydroxide, calcium hydroxide, magnesium hydroxide, calcium carbonate, magnesium carbonate, barium carbonate, calcium sulfite, magnesium sulfite, calcium sulfate, magnesium sulfate, aluminum sulfate, calcium oxide, aluminum oxide, silicon oxide, talc, clay, kaolin and zeolite.

6. A process according to claim 1, wherein said expandable particles of the polyolefin resin contain a blowing agent.

7. A process according to claim 6, wherein said blowing agent is an inorganic gas an organic volatile blowing agent or a mixture thereof.

8. A process according to claim 1, wherein said polyolefin resin contains secondary crystals.

* * * * *